(12) United States Patent
Naftolin

(10) Patent No.: US 9,462,114 B2
(45) Date of Patent: *Oct. 4, 2016

(54) INCONSPICUOUS MODE FOR MOBILE DEVICES

(71) Applicant: Microsoft Technology Licensing, LLC, Redmond, WA (US)

(72) Inventor: Jordan Naftolin, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/569,706

(22) Filed: Dec. 13, 2014

(65) Prior Publication Data

US 2015/0172444 A1 Jun. 18, 2015

Related U.S. Application Data

(63) Continuation of application No. 13/851,776, filed on Mar. 27, 2013, now Pat. No. 8,934,879, which is a continuation of application No. 13/177,590, filed on Jul. 7, 2011, now Pat. No. 8,483,772.

(51) Int. Cl.
*H04M 1/725* (2006.01)
*H04W 52/02* (2009.01)
*G06F 9/44* (2006.01)

(52) U.S. Cl.
CPC ........ *H04M 1/72569* (2013.01); *G06F 9/4421* (2013.01); *H04M 1/72572* (2013.01); *H04W 52/027* (2013.01)

(58) Field of Classification Search
CPC .................... H04M 1/72569; H04M 1/72572; H04W 52/027
See application file for complete search history.

(56) References Cited

U.S. PATENT DOCUMENTS

| | | | |
|---|---|---|---|
| 7,843,422 B1 | 11/2010 | Ludden et al. | |
| 8,483,772 B2 * | 7/2013 | Naftolin | 455/566 |
| 2008/0165115 A1 | 7/2008 | Herz et al. | |

(Continued)

OTHER PUBLICATIONS

"AT&T: How do I Adjust the Contrast, Brightness, or Backlight on My SGH-i897 (Captivate) Phone?", Retrieved at <<http://ars.samsung.com/customer/usa/jsp/faqs/faqs_view_us.jsp?SITE_ID=22&PG_ID=2&PROD_SUB_ID=557&PROD_ID=558&AT_ID=256142>>, Retrieved Date: Mar. 14, 2011, Dec. 8, 2010, pp. 4.

(Continued)

Primary Examiner — Kashif Siddiqui
(74) Attorney, Agent, or Firm — Judy Yee; Micky Minhas

(57) ABSTRACT

A communication device is configured to switch from a normal mode of operation to an inconspicuous mode of operation in which a reduced set of information is presented on a home screen of a display of the device in comparison to a set of information presented on the home screen in the normal mode of operation. In addition, other display properties such as contrast and brightness may be adjusted to make them less conspicuous. The home screen in the inconspicuous mode of operation is less obtrusive or conspicuous to individuals than in the normal mode of operation. The device may enter the inconspicuous mode upon user request or by detecting at least one environmental condition using a sensor available to the mobile communication device. The environmental condition may be anything that the device can detect or sense in its surrounding environment such as ambient light or sound. The device may return to the normal mode of operation by user request or when the environmental condition is no longer present.

20 Claims, 4 Drawing Sheets

(56) References Cited

U.S. PATENT DOCUMENTS

2010/0039414 A1    2/2010  Bell
2010/0060669 A1    3/2010  Cheng
2010/0277452 A1   11/2010  Muraki

OTHER PUBLICATIONS

"Intelligent Sensing With Ambient Light and Optical Proximity Sensors", Retrieved at <<http://www.avagotech.com/docs/AV00-0151EN>>, Retrieved Date: Mar. 14, 2011, pp. 16.

"Nokia 6710 Navigator", Retrieved at <<http://mobilephonereviews.blogger.ba/arhiva/2009/05/24/2183081>>, May 24, 2009, pp. 10.

"Programmable Current Backlight Driver with Ambient Light Sensor Input", Retrieved at <<http://www.analog.com/static/imported-files/data_sheets/ADP5501.pdf>>, Retrieved Date: Mar. 14, 2011, pp. 1-28.

"Samsung LCD mobile display", Retrieved at <<http://www.letsgomobile.org/en/1172/samsung-lcd-mobile-display/>>, Apr. 6, 2007, pp. 2.

"Non-Final Office Action Issued in U.S. Appl. No. 14/569,705", Mailed Date: Aug. 26, 2015, 7 Pages.

"Final Rejection Received in U.S. Appl. No. 14/569,705", Mailed Date: Dec. 7, 2015, 6 Pages.

Notice of Allowance from U.S. Appl. No. 14/569,705, Mailed Date: Mar. 16, 2016, 8 Pages.

\* cited by examiner

INCONSPICUOUS MODE FOR MOBILE DEVICES

CROSS-REFERENCE TO RELATED APPLICATION(S)

This application is a continuation of U.S. patent application Ser. No. 13/851,776, filed on Mar. 27, 2013, entitled "INCONSPICUOUS MODE FOR MOBILE DEVICES" which is now U.S. Pat. No. 8,934,879, issued Jan. 13, 2015, which is a continuation of U.S. patent application Ser. No. 13/177,590, filed on Jul. 7, 2011, entitled "INCONSPICUOUS MODE FOR MOBILE DEVICES," which is now U.S. Pat. No. 8,483,772, issued Jul. 9, 2013. All of the aforereferenced applications are hereby incorporated by reference.

BACKGROUND

Mobile communication devices are increasingly important and are in common use in many environments. Accordingly, individuals often keep them on their person throughout large portions of the day. In part, the ubiquity of mobile communication devices arises because such devices are often capable of performing many different functions. For instance, mobile communication devices may support any of a variety of applications, such as a telephone application, a video conferencing application, an e-mail application, an instant messaging application, a blogging application, a digital camera application, a digital video camera application, a web browsing application, a digital music player application, and/or a digital video player application, and so on.

One problem with the ubiquity of these devices in so many different environments is that their use in not appropriate in all settings. As one common example, in a theater the sound from a mobile communication device and the light from its display can be distracting to other theater patrons. Even if the user deactivates certain features such as audio notification of incoming calls and text messages, users may still rely on other features while in the theater. For example, mobile communication devices are sometimes used as a substitute for a watch, and these people may use the device to check the time while in the theater. Even this use of the device can be distracting to other theater patrons because of the light emanating from the display when the user looks at the display to see the time. Many of these same and other similar problems arise not only in theaters, but in other environments and venues such as in a meeting room, automobile and even bedrooms.

SUMMARY

In some implementations a communications device may be placed in an inconspicuous mode in which its display and certain hardware features are modified so that the device is better suited for an environment such as a theater or other venue in which individuals other than the user do not wish to be disturbed by the communication device. While in the inconspicuous mode, specific features may be disabled such as the generation of sound. Additionally, the appearance of the display may be changed. For instance, the brightness may be decreased, the contrast may be increased, and information presented on the home or default screen will be changed. For instance, all information and notifications may be removed from the screen except for a limited number of items that may be user-selectable. For instance, in one implementation, any background images may be replaced with a dark solid color and only a single notification (e.g., time-of-day) is presented which is easy to read on the dark screen. In one particular implementation, the communication device is configured to enter the inconspicuous mode upon user request or upon detecting at least one environmental condition using a sensor available to the mobile communication device. The environmental condition may be anything that can be detected or sensed by the mobile communication device while in the venue or other environment. The sensor determines if the detected environmental condition satisfies at least one prescribed criterion. If it does, the communication device switches from a normal mode of operation to an inconspicuous mode of operation in which a reduced set of information is presented on a home screen of a display of the mobile communication device in comparison to a set of information presented on the home screen of the display of the mobile communication device in the normal mode of operation. The home screen in the inconspicuous mode of operation is less obtrusive or conspicuous to individuals than in the normal mode of operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
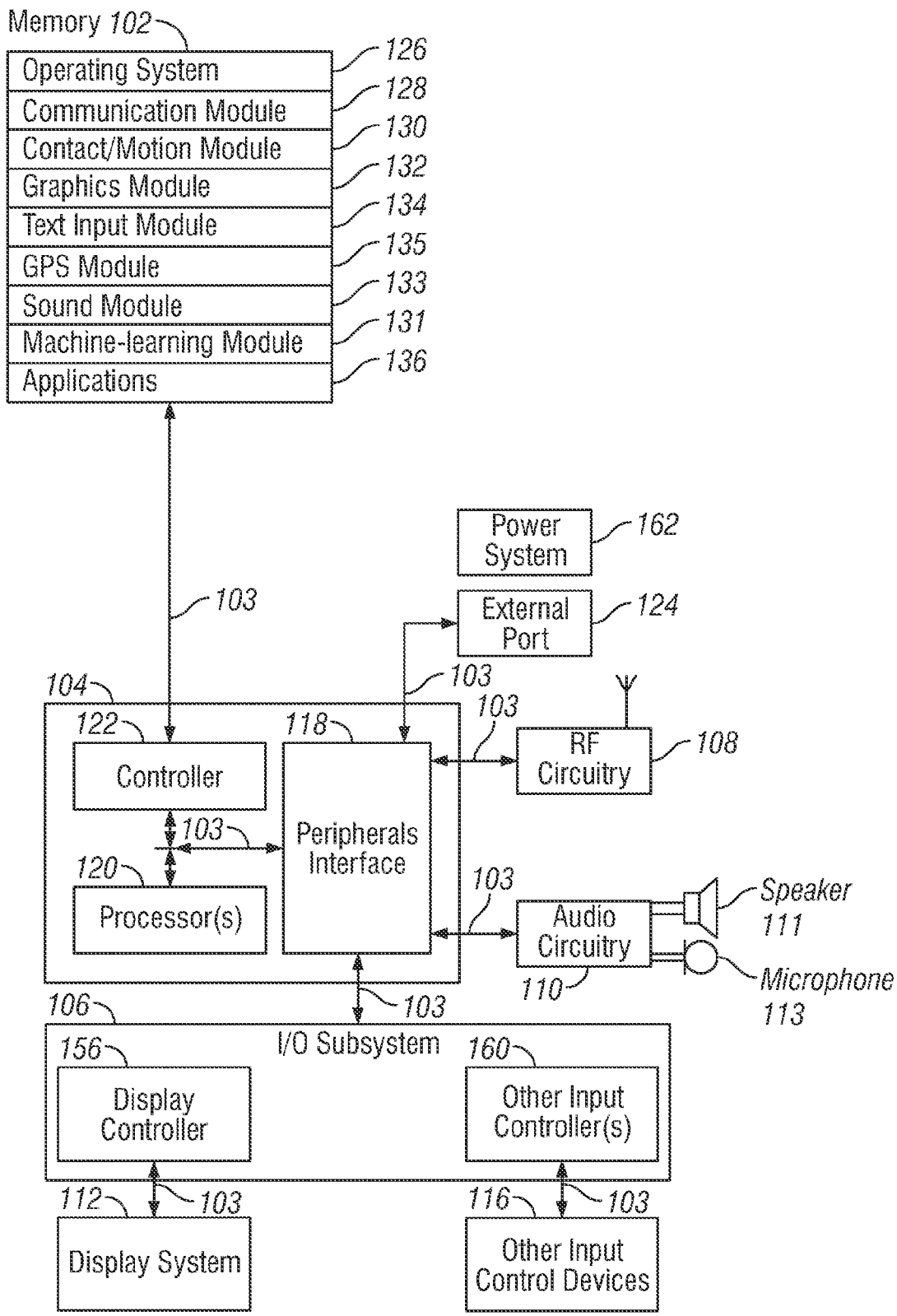
FIG. 1 is a block diagram illustrating one example of a mobile communication device.

FIG. 1 is a block diagram illustrating one example of a computing device 100. In some examples the device is a mobile communications device such as a wireless telephone that also contains other functions, such as PDA and/or music player functions. To that end the device may support any of a variety of applications, such as a telephone application, a video conferencing application, an e-mail application, an instant messaging application, a blogging application, a digital camera application, a digital video camera application, a web browsing application, a digital music player application, and/or a digital video player application. While the example in FIG. 1 is depicted as a mobile communications device, the computing device more generally may by any of a wide variety of different devices such as a laptop computer, a tablet computer, a smart phone and a netbook, for example.

The device 100 includes a memory unit 102 (which may include one or more computer readable storage media), a memory controller 122, one or more processors (CPU's) 120, a peripherals interface 118, RF circuitry 108, audio circuitry 110, a speaker 111, a microphone 113, display system 103, an input/output (I/O) subsystem 106, other input or control devices 116, and an external port 124. These components may communicate over one or more communication buses or signal lines 103. Along with the input or control devices 116, the speaker 111, microphone 113 and display system 103 form a user interface through which a user can enter and receive various types of information and can communicate with other individuals over communication networks using RF circuitry 108.

It should be appreciated that the device 100 is only one example of a mobile communications device 100 and that the device 100 may have more or fewer components than shown, may combine two or more components, or a may have a different configuration or arrangement of components. The various components shown in FIG. 1 may be implemented in hardware, software or a combination of both hardware and software, including one or more signal processing and/or application specific integrated circuits.

Memory unit 102 may include high-speed random access memory and non-volatile memory, such as one or more magnetic disk storage devices, flash memory devices, or other non-volatile solid-state memory devices. Access to memory unit 102 by other components of the device 100, such as the CPU 120 and the peripherals interface 118, may be controlled by the memory controller 122. The peripherals interface 118 couples the input and output peripherals of the device to the CPU 120 and memory unit 102. The one or more processors 120 run or execute various software programs and/or sets of instructions stored in memory unit 102 to perform various functions for the device 100 and to process data. In some examples the peripherals interface 118, the CPU 120, and the memory controller 122 may be implemented on a single chip, such as a chip 104. In other examples they may be implemented on separate chips.

The RF (radio frequency) circuitry 108 includes a receiver and transmitter (e.g., a transceiver) for respectively receiving and sending RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 form a part of the user interface provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from audible signals (i.e., sound waves). The speaker 111 and microphone 113 are two examples of audio transducers that may be employed in the mobile communications device. The audio circuitry 110 converts the electrical signal to audio data and transmits the audio data to the peripherals interface 118 for processing. Audio data may be retrieved from and/or transmitted to memory unit 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the display screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some examples input controller(s) 160 may be coupled to any (or none) of the following: a keyboard, infrared port, USB port, and a pointer device such as a mouse.

The display screen 112 provides an input interface and an output interface between the device and a user. The display controller 156 receives and/or sends electrical signals from/to the display screen 112. The display screen 112 displays visual output to the user. The visual output may include graphics, text, icons, video, and any combination thereof (collectively termed "graphics").

The display screen 112 will generally include a suitable display such as an OLED display, PLED display, active matrix liquid crystal display, passive matrix liquid crystal display, electrophoretic display, cholesteric liquid crystal display, polymer dispersed liquid crystal and nematic liquid crystal display. In some implementations the display screen 112 may be a touch-screen display.

The device 100 also includes a power system 162 for powering the various components. The power system 162 may include a portable power supply (e.g., battery) and components necessary to receive power from an alternating current (AC) source, a power management system, a recharging system, a power failure detection circuit, a power converter or inverter and any other components associated with the generation, management and distribution of power in portable devices.

In some embodiments, the software components stored in memory unit 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, a sound module 133 (or set of instructions) and applications (or set of instructions) 136.

The operating system 126 (e.g., Darwin, RTXC, LINUX, UNIX, OS X, Microsoft WINDOWS®, Android or an embedded operating system such as VxWorks) includes various software components and/or drivers for controlling and managing general system tasks (e.g., memory management, storage device control, power management, etc.) and facilitates communication between various hardware and software components. The communication module 128 facilitates communication with other devices over one or more external ports 124 and also includes various software components for handling data received by the RF circuitry 108 and/or the external port 124 (e.g., Universal Serial Bus (USB), FIREWIRE, etc.).

The graphics module 132 includes various known software components for rendering and displaying graphics on the display screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., applications that provide location-based services such as weather widgets, local yellow page widgets, and map/navigation widgets).

The applications 136 may include any combination of the following illustrative modules: a contacts module, a telephone module; a video conferencing module; an e-mail client module an instant messaging (IM) module; a blogging module; a camera module; an image management module; a video player module; a music player module; a browser module; a word processing module; a voice recognition module; a calendar module; widget modules, which may include a weather widget, stocks widget, calculator widget, alarm clock widget, dictionary widget, and other widgets obtained by the user, as well as user-created widgets.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory unit 102 may store a subset of the modules and data structures identified above. Furthermore, memory unit 102 may store additional modules and data structures not described above.

As previously mentioned, an inconspicuous mode is a mode of operation that can be activated on a communications device which modifies its display and certain hardware features so that the device is better suited for an environment such as a theater or other venue in which individuals other than the user do not wish to be disturbed by the communication device. While in the inconspicuous mode, specific features may be disabled such as the generation of sound. Additionally, the appearance of the display will be changed. For instance, the brightness may be decreased, the contrast may be increased, and information presented on the home or default screen will be changed. For instance, all information and notifications may be removed from the screen except for a limited number of items that may be user-selectable. Moreover, the items remaining on the screen can by presented in a less disturbing manner by, for instance, controlling the background, such as by making it a solid color. In general, the user will be able to customize the item or items that appear on the display when the device is in the inconspicuous mode.

Figure 2:
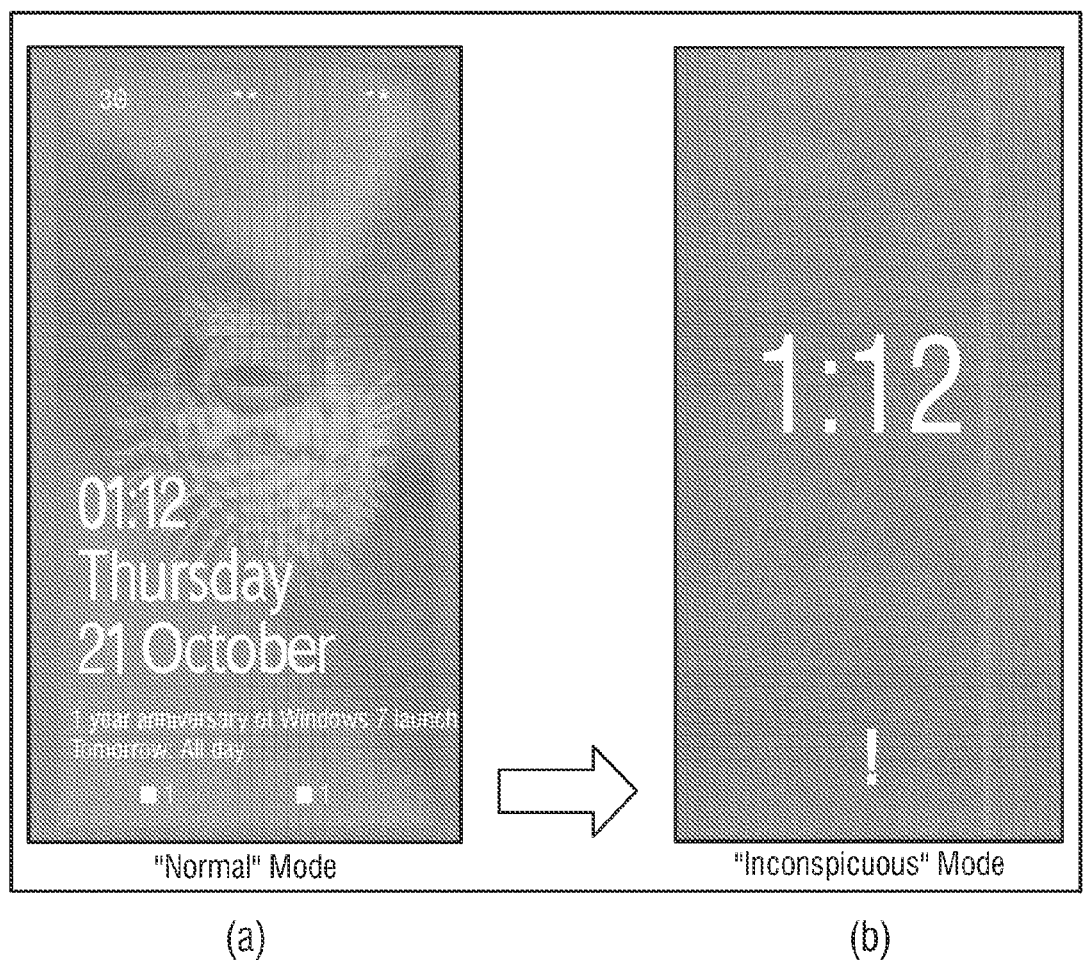
FIG. 2 shows an example of the default or home screen when the mobile communication device is in its normal mode of operation, and an example of the default or home screen when the mobile communication device is in its inconspicuous mode of operation.

FIG. 2 shows an example (a) of the default or home screen when the mobile communication device is in its normal mode of operation, and an example (b) of the default or home screen when the mobile communication device is in its inconspicuous mode of operation. As shown in example (a), in its normal mode, the screen presents a background image and provides various information concerning device status, the number of unanswered voice and text messages and so on. On the other hand, as shown in example (b), the only information presented is the current time of day and a small indicator, which serves as notification to the user that some prioritized event has occurred. For example, the indicator may indicate that a message has been received from one more individuals who have been specified by the user as being of high priority. The indicator will not be displayed if messages have only been received from other individuals. Other than showing the time of day and the indicator, the remainder of the display will be dark in this implementation.

Figure 3:
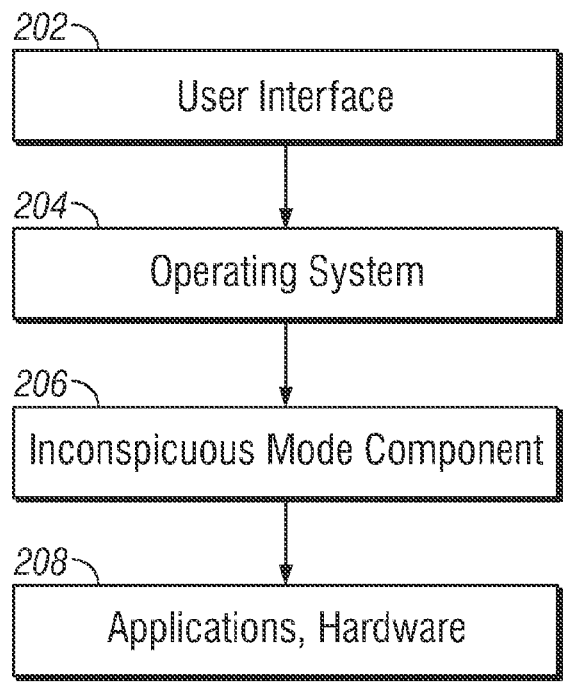
FIG. 3 shows one example of a system for implementing an inconspicuous mode of operation on a mobile communication device such as the device shown in FIG. 1.

FIG. 3 shows one example of a system for implementing an inconspicuous mode in a mobile communication device such as the device shown in FIG. 1. The system includes a graphical, text-based or other user interface 202 that is presented to a user, through which, among other things, the user can configure various settings for the inconspicuous mode. The user interface 202 interacts with the operating system 204. The operating system 204 interacts with an inconspicuous mode component 206 for controlling access to various applications or features 208 of the device, including certain hardware features such as the display and other output devices such as the speaker. In some implementations the inconspicuous mode component 206 may be directly incorporated into the operating system.

The user interface 202 allows a user to select which items are to appear on the display while the device is in the inconspicuous mode. It may also allow the user to control other aspects of the inconspicuous mode such as the precise brightness level of the display when in the inconspicuous mode, the environmental conditions or factors that may automatically trigger the device to enter the inconspicuous mode (discussed in more detail below), and so on. Among other things, the user interface 202 may provide a list or menu from which the user can select or unselect those specific items that are to be displayed while in the inconspicuous mode. The items or information which are presented represent a limited subset of the items or information that would be presented in the normal mode.

Generally, the behavior of any application or feature installed on the device can be modified while the device is in the inconspicuous mode. In some implementations the user interface may present a default set of items whose appearance on the display will be modified, as well as the specific way in which those items will be modified while the device is in the inconspicuous mode.

For example, the user may specify that only the time so day should be displayed in inconspicuous mode and that its brightness should be reduced by e.g., 60%, from its maximum value. The user may also be able to choose how other aspects of the display are presented. For instance, the user may be given a choice of font sizes and colors from which to choose. The choices presented to the user may be those which are relatively inconspicuous in comparison to the choices that would otherwise be available.

The mobile communication device can enter the inconspicuous mode automatically or upon user selection. Automatic entry can be triggered upon the occurrence of any of a wide variety of events that can be detected by the mobile communication device. Many of these events involve the detection of environmental conditions that can be detected by one or more sensors incorporated in the mobile communication device. Two examples of such environmental conditions are ambient sound and ambient light levels, which the device can detect using a light sensor and microphone, respectively.

In one example, the mobile communication device may enter the inconspicuous mode when it detects that the ambient light level has fallen below a certain level, which may reflect, for instance, that the user is in a darkened theater or is about to go to bed. Likewise, the device may enter the inconspicuous mode when it detects that the ambient sound or noise level has fallen below a certain level, which may again reflect, for instance, that the user is in a darkened theater in which a movie is about to begin, or that the user is about to go to bed. Moreover, these environmental conditions may be detected and used in combination to better assess whether the device should enter the inconspicuous mode. As one example, if the device detects both a low light level and a low noise level, the device may be configured (by default or user specification) to enter the inconspicuous mode, whereas if the device detects both a low light level and a noise level above some threshold, the device may be configured (by default or user specification) so that it does not enter the inconspicuous mode. The former situation may indicate, for instance, that the device is located in a bedroom in which the user is sleeping, while the latter situation may indicate, for instance, that the user is watching TV or listening to music in a darkened room.

Many additional conditions reflecting the environment in which the mobile communication device is located may be used to determine when to enter (and possibly exit) the inconspicuous mode. For instance, in one implementation the mobile communication device includes a device location module such as a global positioning system (GPS) receiver (e.g., GPS module 135 shown in FIG. 1). GPS receivers are capable of updating a device's location on a real or near real-time basis. The location is typically represented in terms of the physical coordinates of the mobile device on the surface of the Earth, which typically outputs a location as latitude and longitude values. The GPS receiver can also employ other geo-positioning mechanisms, including, but not limited to, triangulation, assisted GPS (AGPS), E-OTD, CI, SAI, ETA, BSS or the like, to further determine the physical location of the mobile communication device 200. If the mobile communication device can compare its location data to a map or other database that identifies the venues corresponding to that location, the device can determine whether and when it should enter the inconspicuous mode. If, for instance, the device uses its location information to determine that it is in a theater, it may automatically enter inconspicuous mode. The venue map or database information needed to identify the venue in which the device is located, along with the processing necessary to compare the location data to the venue map or database information may be resident on the mobile communication device or it may be in whole or in part offered to the mobile communication device as a cloud-based service.

Yet another source of data that the mobile communication device may use to determine when it is in a venue that should trigger initiation of the inconspicuous mode is calendar data that may be available from a scheduling application resident on the device. For instance, if the user enters into the device's calendar that he or she will be attending the theater on Tuesday at 7 pm or that attending a dinner on Thursday at 8 pm, the inconspicuous mode component 206 may access this data and perform a keyword search to determine those days and times when it should enter the inconspicuous mode. Such a calendar or scheduling application may be embodied, for example, in commercially available software such as Microsoft Corporation's Outlook® messaging and collaboration client.

Other applications resident on the device may be used to obtain information for determining when to enter the inconspicuous mode. For example, if the device is used to purchase tickets or the like through its web browser or through an application that employs a Near Field Communication (NFC) or RFID sensor, which allows the user to swipe the device over an NFC or RFID tag to purchase or claim a ticket, the incoming information can be parsed by the inconspicuous mode component 206 to determine where and when to enter the inconspicuous mode.

In other implementations mobile communication device may, through other components, obtain other information that might be employed to determine the location of the device, including for example, Wi-Fi access points having particular service set identifiers (SSIDs), e.g., "home," "ABC theater", or even a MAC address, IP address, or the like which is associated with a specific location. In some cases the venue itself may participate in the venue determination process. For example, at the beginning of a movie, the theater may send a localized broadcast to all devices within the venue instructing them to enter an inconspicuous mode. The broadcast may be of any type that can be detected by the mobile communication device and may be, for example, in the form of an audio, optical, RFID or text message.

Figure 4:
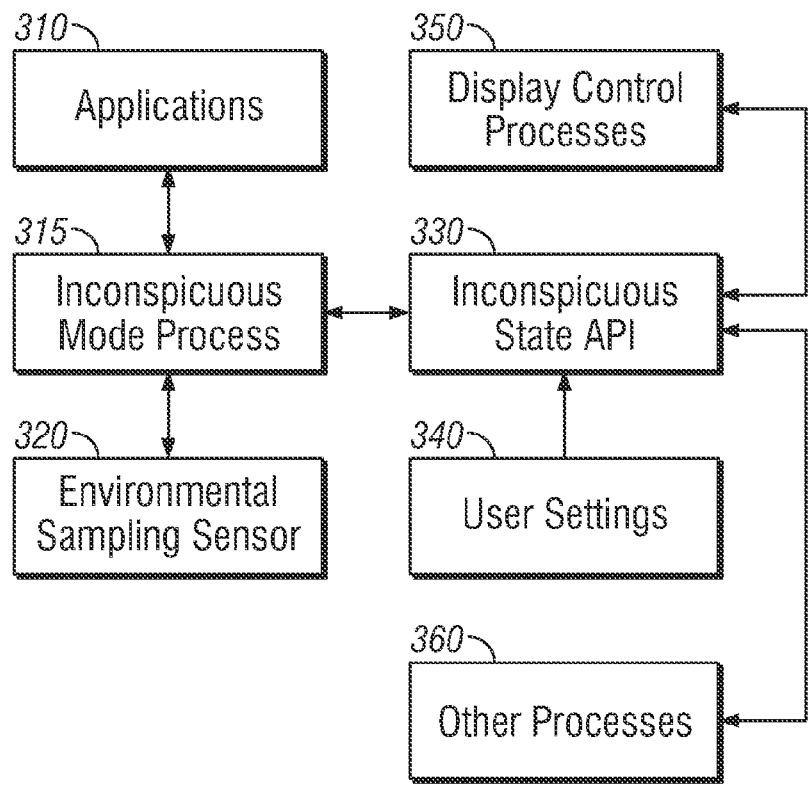
FIG. 4 is a block diagram depicting in more detail one particular implementation of the inconspicuous mode system shown in FIG. 3.

FIG. 4 is a block diagram depicting in more detail one particular implementation of the inconspicuous mode component 206 shown in FIG. 3. As shown, the inconspicuous mode component includes, among other things, an inconspicuous mode process 315, inconspicuous state API 330, user settings 340, display control processes 350 and other devices processes 360.

In operation, information obtained from one or more environmental sampling sensors 320 (e.g., microphone, light sensor, GPS) or one or more applications 310 (e.g., calendar, web browser) initiates an inconspicuous mode process 315 that communicates with the device operating system via an inconspicuous state API 330. The inconspicuous mode process 315 extracts or otherwise parses pertinent information from the sampling sensor(s) 320 and/or the application(s) 310. The inconspicuous mode process 315 also accesses user settings 340 that are maintained in memory or other storage via inconspicuous state API 330. The user settings 340 contain a record of information provided by the user through the user interface 202 (see FIG. 3). The information specifies the conditions under which the device should enter the inconspicuous mode and the actions that the device should take while in the inconspicuous mode. If no user settings have been specified, then a default record may be accessed by the inconspicuous mode process 315. The inconspicuous mode process 315 compares the pertinent information extracted or parsed from the sampling sensor(s) 320 and/or application(s) 310, and compares it to the information obtained from user settings 340 or from default settings. If the protected mode process 315 determines that the environmental conditions indicate that the device should enter the inconspicuous mode, it causes the protected state API 330 to perform any adjustments to the information presented on the device display as well as any adjustments to device hardware (e.g., speaker or ringer) that are needed to place the device in the inconspicuous mode.

Figure 5:
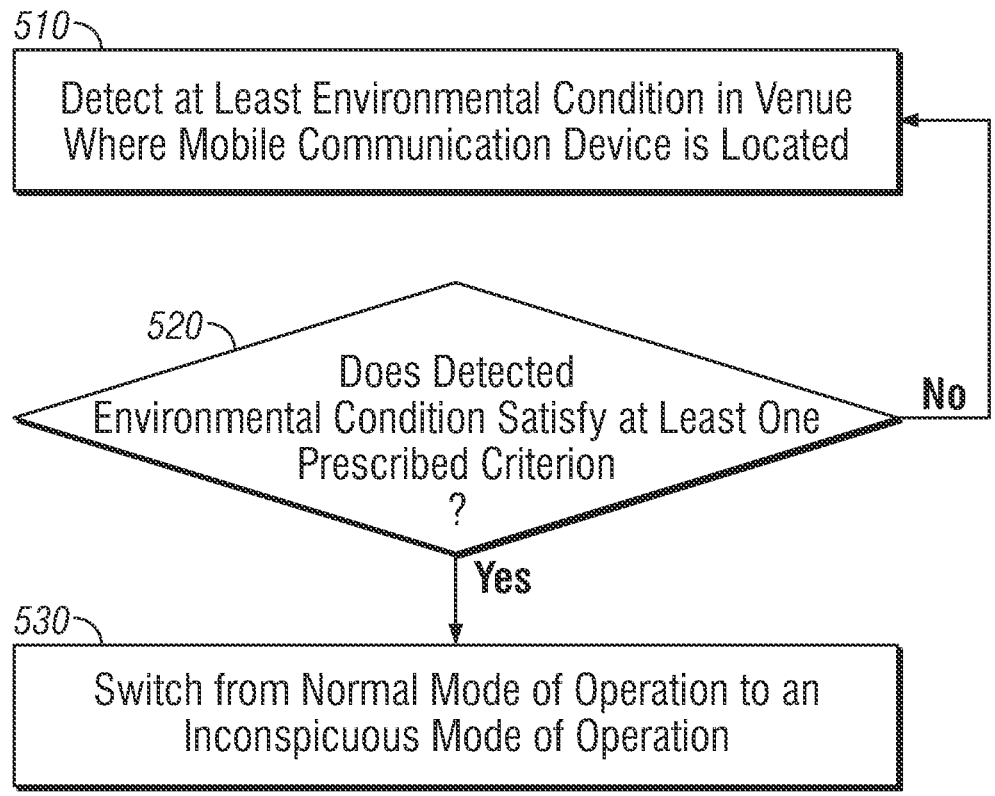
FIG. 5 is a flowchart illustrating one example of the operation of a mobile communication device having the inconspicuous mode system described herein.

FIG. 5 is a flowchart illustrating one example of the operation of a mobile communication device having the inconspicuous mode system described herein. The method begins at step 510 when at least one environmental condition is detected in a venue where the mobile communication device is located using a sensor available to the mobile communication device. The environmental condition may be anything that can be detected or sensed by the mobile communication device while in the venue. Illustrative conditions include light or sound levels and location information. At decision step 520, the sensor determines if the detected environmental condition satisfies at least one prescribed criterion. If not, then at step 530 the process returns to step 510 where the environmental condition continues to be monitored. If the detected environmental condition satisfies the environmental condition, the communication device switches from a normal mode of operation to an inconspicuous mode of operation in which a reduced set of information is presented on a home screen of a display of the mobile communication device in comparison to a set of information presented on the home screen of the display of the mobile communication device in the normal mode of operation. The home screen in the inconspicuous mode of operation is less obtrusive or conspicuous to individuals than in the normal mode of operation.

Figure 6:
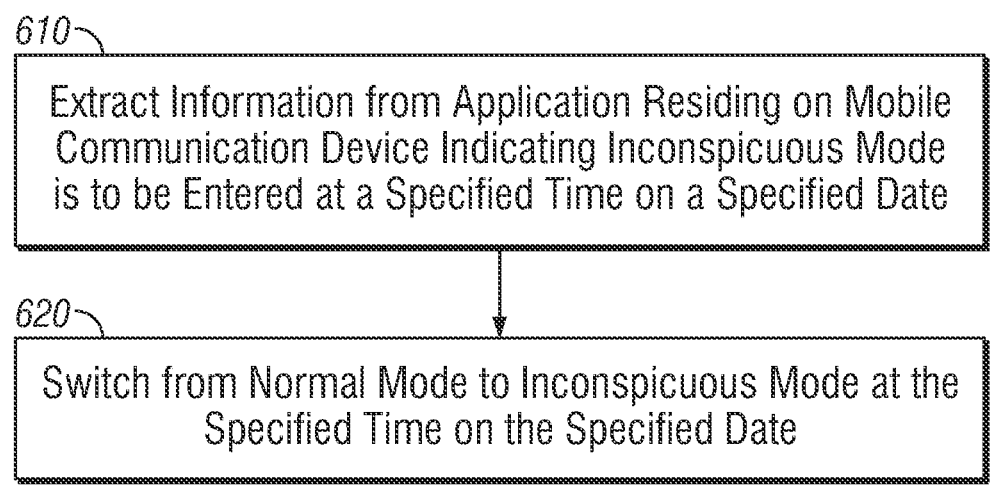
FIG. 6 is a flowchart illustrating another example of the operation of a mobile communication device having the inconspicuous mode system described herein.

FIG. 6 is a flowchart illustrating another example of the operation of a mobile communication device having the inconspicuous mode system described herein. The method begins in step 610 by extracting information from an application residing on the mobile communication device indicating that the mobile communication device should enter the inconspicuous mode at a specified time on a specified date. At the specified time on the specified date, the mobile communication switches in step 620 from the normal mode of operation to the inconspicuous mode of operation. In one implementation, in the inconspicuous mode all information that otherwise would be presented on the home screen of the mobile communication device in the normal mode of operation is eliminated except for time of day information and possibly an indicator of prioritized information.

The mobile communication device can exit the inconspicuous mode and return to the normal mode upon the user's request. For instance, in some implementations the user may swipe an appropriate portion of the screen or shake the device in order to return to normal mode. The device may also return to the normal mode of operation when the environmental condition which caused it to enter the inconspicuous mode is no longer present.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-readable storage device containing instructions for causing a mobile device to perform operations, the operations comprising:
   obtaining a location of the mobile device using a device location module of the mobile device;
   determining that the obtained location of the mobile device corresponds to a venue at which the mobile device is to operate in an inconspicuous mode of operation in which a reduced set of information is presented on a home screen of a display of the mobile device relative to a set of information presented on the home screen of the display of the mobile device in a normal mode of operation; and
   in response to determining that the obtained location of the mobile device corresponds to a venue at which the mobile device is to operate in the inconspicuous mode of operation, switching from the normal mode of operation to the inconspicuous mode of operation.

2. The computer-readable storage device of claim 1, wherein the determining that the obtained location of the mobile device corresponds to a venue at which the mobile device is to operate in an inconspicuous mode of operation includes:
   a comparison of the location of the mobile device to locations of venues stored in a venue database.

3. The computer-readable storage device of claim 2, wherein the venue database is stored at the mobile device.

4. The computer-readable storage device of claim 2, wherein the venue database is external to the mobile device.

5. The computer-readable storage device of claim 1, wherein the determining that the obtained location of the mobile device corresponds to a venue at which the mobile device is to operate in an inconspicuous mode of operation is based at least in part on information received by the mobile device from the venue at which the mobile device is to operate in an inconspicuous mode of operation.

6. The computer-readable storage device of claim 1, wherein the device location module comprises at least one of a global positioning system (GPS) receiver or a mobile telephony network based location determination module.

7. The computer-readable storage device of claim 1, wherein the reduced set of information includes at least one of time information, date information, or a notification of an occurrence of an event.

8. The computer-readable storage device of claim 1, wherein a brightness of the home screen is dimmer in the inconspicuous mode of operation than in the normal mode of operation.

9. A method executed on a mobile device, the method comprising:
  obtaining a location of the mobile device using a device location module of the mobile device;
  determining that the obtained location of the mobile device corresponds to a location at which the mobile device is to operate in an inconspicuous mode of operation in which a reduced set of information is presented on a home screen of a display of the mobile device relative to a set of information presented on the home screen of the display of the mobile device in a normal mode of operation; and
  in response to determining that the obtained location of the mobile device corresponds to a location at which the mobile device is to operate in an inconspicuous mode of operation, switching from the normal mode of operation to the inconspicuous mode of operation.

10. The method of claim 9, wherein the determining that the obtained location of the mobile device corresponds to a location at which the mobile device is to operate in an inconspicuous mode of operation includes:
  a determination of whether the obtained location of the mobile device corresponds to a venue listed in a venue database.

11. The method of claim 10, wherein the venue database is external to the mobile device.

12. The method of claim of claim 9, wherein the determining that the obtained location of the mobile device corresponds to a location at which the mobile device is to operate in an inconspicuous mode of operation is based at least in part on information received by the mobile device from a venue located at the obtained location of the mobile device.

13. The method of claim 9, wherein the reduced set of information includes time and/or date information.

14. The method of claim 9, wherein a brightness of the home screen is dimmer in the inconspicuous mode of operation than in the normal mode of operation, and wherein at least one audio indication is disabled in the inconspicuous mode of operation.

15. A mobile device, comprising:
  a location determination module operable to determine a location of the mobile device; and
  a memory and a processor that are respectively adapted to store and execute instructions, including instructions that perform operations, the operations including:
    determining that the location of the mobile device satisfies a predefined criteria; and
    in response to determining that the location of the mobile device satisfies a predefined criteria, switching from a normal mode of operation to an inconspicuous mode of operation in which a reduced set of information is presented on a home screen of a display of the mobile device relative to a set of information presented on the home screen of the display of the mobile device in the normal mode of operation.

16. The mobile device of claim 15, wherein the determining that the location of the mobile device satisfies a predefined criteria includes:
  determining that the location of the mobile device corresponds to a venue at which the mobile device should transition to the inconspicuous mode of operation.

17. The mobile device of claim of claim 16, wherein the determining that the location of the mobile device corresponds to a venue at which the mobile device should transition to the inconspicuous mode of operation is based at least in part on information received by the mobile device from the venue at which the mobile device should transition to the inconspicuous mode of operation.

18. The mobile device of claim 15, wherein the location determination module is operable to determine the location of the mobile device based on a mobile telephony network based location determination technique.

19. The mobile device of claim 15, wherein the reduced set of information includes time information.

20. The mobile device of claim 15, wherein a brightness of the home screen is dimmer in the inconspicuous mode of operation than in the normal mode of operation.

* * * * *